(12) United States Patent
Erickson et al.

(10) Patent No.: US 8,099,501 B1
(45) Date of Patent: *Jan. 17, 2012

(54) ADAPTER ARCHITECTURE

(75) Inventors: Joey L. Erickson, New Brighton, MN (US); Daniel P. Starkovich, Brooklyn Park, MN (US); Scott L. Rappa, White Bear Lake, MN (US); Robert J. Gambrel, Spring Lake Park, MN (US)

(73) Assignee: Unisys Corporation, Blue Bell, PA (US)

( * ) Notice: Subject to any disclaimer, the term of this patent is extended or adjusted under 35 U.S.C. 154(b) by 2139 days.

This patent is subject to a terminal disclaimer.

(21) Appl. No.: 09/594,408

(22) Filed: Jun. 15, 2000

(51) Int. Cl. *G06F 15/16* (2006.01)
(52) U.S. Cl. .......... 709/227; 709/230; 709/246
(58) Field of Classification Search .......... 709/230–232, 709/246
See application file for complete search history.

(56) References Cited

U.S. PATENT DOCUMENTS

| 5,377,191 | A | * | 12/1994 | Farrell et al. | 370/401 |
| 5,758,351 | A | * | 5/1998 | Gibson et al. | 707/104.1 |
| 5,790,809 | A | * | 8/1998 | Holmes | 709/228 |
| 5,845,267 | A | * | 12/1998 | Ronen | 705/40 |
| 5,859,972 | A | * | 1/1999 | Subramaniam et al. | 709/203 |
| 5,933,599 | A | * | 8/1999 | Nolan | 345/734 |
| 6,038,296 | A | * | 3/2000 | Brunson et al. | 379/100.11 |
| 6,041,325 | A | * | 3/2000 | Shah et al. | 707/10 |
| 6,115,744 | A | * | 9/2000 | Robins et al. | 709/227 |
| 6,212,546 | B1 | * | 4/2001 | Starkovich et al. | 709/203 |
| 6,233,619 | B1 | * | 5/2001 | Narisi et al. | 709/230 |
| 6,304,915 | B1 | * | 10/2001 | Nguyen et al. | 709/250 |
| 6,324,681 | B1 | * | 11/2001 | Sebesta et al. | 717/102 |
| 6,370,588 | B2 | * | 4/2002 | Gebauer | 709/246 |
| 6,397,220 | B1 | * | 5/2002 | Deisinger et al. | 707/102 |
| 6,453,356 | B1 | * | 9/2002 | Sheard et al. | 709/231 |

FOREIGN PATENT DOCUMENTS

WO WO 01/95145 * 12/2001

OTHER PUBLICATIONS

"SOAP: Simple Object Access Protocol", MSDN Online Web Workshop, http://msdn.microsoft.com/xml/general/soapspec.asp, Apr. 26, 2000.*

* cited by examiner

*Primary Examiner* — Jeffrey R Swearingen
(74) *Attorney, Agent, or Firm* — Richard J. Gregson; Robert P. Marley; Nawrocki-Rooney (57) ABSTRACT

An apparatus for and method of processing service requests having a number of formats within a single generic gateway. The service requests are received by the server and routed to the appropriate one of a number of adapters. Each of the adapters convert service requests to a standardized format for input to the single generic gateway. The output of the single generic gateway is coupled through a corresponding one of a number of connectors to the end service provider for honoring.

8 Claims, 7 Drawing Sheets

ADAPTER ARCHITECTURE

CROSS REFERENCE TO CO-PENDING APPLICATIONS

The present application is related to U.S. patent application Ser. No. 09/310,717, filed May 12, 1999, entitled "A GENERIC DCOM SERVER; U.S. patent application Ser. No. 09/164,932, filed Oct. 1, 1998, entitled "A MULTI-USER CUSTOMIZED DCOM GATEWAY FOR AN OLTP ENTERPRISE SERVER APPLICATION"; U.S. patent application Ser. No. 09/400,647, filed Sep. 21, 1999, entitled "WEBTX MESSAGE QUEUE SYSTEM"; U.S. patent application Ser. No. 09/400,646, filed Sep. 21, 1999, entitled "WEBTX TRANSACTION QUEUE SYSTEM"; and application Ser. No. 09/164,759, filed Oct. 1, 1998, entitled "A COMMON GATEWAY WHICH ALLOWS APPLETS TO MAKE PROGRAM CALLS TO OLTP APPLICATIONS EXECUTING ON AN ENTERPRISE SERVER" now U.S. Pat. No. 6,397,220; which are assigned to the assignee of the present invention and incorporated herein by reference.

BACKGROUND OF THE INVENTION

1. Field of the Invention

The present invention relates to methods and apparatus for facilitating on-line processing requests, and more specifically, to adapting multiple client formats to the use of a single gateway in communicating with an On-Line Transaction Processing (OLTP) Enterprise Server from user work stations.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the prospect of using component software technology—the idea of breaking large, complex software applications into a series of pre-built and easily developed, understood, and changed software modules called components—as a means to deliver software solutions much more quickly and at a lower cost. The goal is to achieve economies of scale for software deployment across the industry.

A component architecture for building software applications will enable this by: 1) speeding development—enabling programmers to build solutions faster by assembling software from pre-built parts; 2) lowering integration costs—providing a common set of interfaces for software programs from different vendors means less custom work is required to integrate components into complete solutions; 3) improving deployment flexibility—making it easier to customize a software solution for different areas of a company by simply changing some of the components in the overall application; and 4) lowering maintenance costs—isolating software function into discreet components provides a low-cost, efficient mechanism to upgrade a component without having to retrofit the entire application.

A distributed component architecture applies these benefits across a broader scale of multiuser applications. The Distributed Component Object Model (DCOM), developed by Microsoft Corporation, has several strengths that make it a key technology for achieving this. Because it is an ActiveX technology, DCOM works natively with Internet technologies like TCP/IP, the Java language, and the HTTP network protocol, providing "object glue" that will enable business applications to work across the Web. DCOM is also an open technology that runs on multiple platforms.

DOOM has its roots in Microsoft's object technology, which has evolved over the last decade from DDE (Dynamic Data Exchange, a form of messaging between Windows programs), OLE (Object Linking and Embedding, embedding visual links between programs within an application), COM (the Component Object Model, used as the basis for all object binding), and ActiveX (COM enabled for the Internet) objects. As stated earlier, applications built from components are simply easier to debug and evolve than large, monolithic applications.

The logical boundary for component applications is no longer on a single machine. Businesses want to leverage the benefits of component development across a broader set of shared applications that operate on multiple machines. These types of applications are referred to as "three-tier" or "n-tier" applications, where "tiers" of application logic, presentation services, business services, and information retrieval and management services, are broken into different components that can communicate directly with each other across a network. To the end user, these applications appear as a seamless extension of their existing desktop environment.

The simplicity, ubiquity, and industry momentum of standard Internet protocols like HTTP make it an ideal technology for linking components together for applications that span machine boundaries. HTTP is easy to program, is inherently cross-platform, and supports an accessible, universal naming service. Much of the excitement around the Java language derives from its potential as a mechanism to build distributed component applications on the Internet. In addition to Java support, DCOM enables components written in other languages, including C, COBOL, Basic, and Pascal, to communicate over the Internet, providing a growth path for existing applications to support Web technology.

As distributed component architectures, such as DCOM, are making their mark as a technology that enables software components to communicate directly with each other across networks, many businesses have a wealth of information that is managed by prior art data base management systems such as DMS, RDMS, DB2, Oracle, Ingres, Sybase, Informix, and many others. In addition, many of the database management systems are available as resources in a larger transaction processing system.

One key to the future success of a business may lie in its ability to capitalize on the ability to interconnect a distributed component architecture, such as DCOM, with existing enterprise On-line Transaction Processing (OLTP) systems. It defeats the two main goals of component-based development, fast time-to-market and lower development costs, if companies are forced to "hand code" into their component applications the mission critical services that are required for online production systems. Therefore, the leading system suppliers have developed commercially available "middleware" to link web based work stations with existing OLTP systems.

However, most existing OLTP systems have been developed under the assumption that user work stations are physically, electrically, and functionally dedicated exclusively to providing communication between the OLTP and a single user during an entire user session period. This assumption arose at a time in which user work stations were simply dumb video display/keyboard devices connected directly to the OLTP mainframe via a dedicated electrical line.

Modern work stations, however, are extremely complex and capable of substantial unassisted data processing. Furthermore, the internet connection between a modern work station and the OLTP enterprise system is anything but physically, electrically, and functionally dedicated exclusively to a single user session.

A further problem arises with the multiple formats of the potential work stations requesting service. The common solution is to provide a separate gateway for each of the disparate formats encountered. However, the development of a large number of gateways is costly and time consuming.

SUMMARY OF THE INVENTION

The present invention overcomes many of the disadvantages associated with the prior art by providing a method and apparatus for adapting transaction requests in multiple formats from web based work stations directed to OLTP enterprise server systems utilizing a single gateway. In the preferred mode, the work station is an industry compatible personal computer running a commercially available browser operating under a common operating system such as Windows. The client work station is coupled, via the internet, to an NT server through the middleware product of the present invention which is a generic WebTx gateway. This gateway permits the user work station to communicate as with other type internet applications.

A plurality of adapters convert each of the differing request formats' into a single input format for the single generic gateway. In this manner, a client may make a service request via C++, ASP (i.e., an active server page from a web browser), or other format. The appropriate corresponding adapter converts the service request to a standardized format and presents the information to the generic gateway. After processing, the generic gateway couples service request information to one of a plurality of corresponding connectors for transfer to the end service provider.

In accordance with one preferred mode of the present invention, a service request is made from an industry compatible personal computer in the form of an ASP created by a commercially available web browser. The web page is transferred to the ASP adapter and converted into the standardized form. The converted service request is transferred to the generic gate, which sends the information to the appropriate one of the plurality of connectors. The selected connector transfers the service request to an enterprise server which honors the service request.

The use of a plurality of adapters and a plurality of connectors, in combination with a single generic gateway, greatly simplifies the development process in that new gateways need not be generated each time a new service request format is encountered. The adapters may be created and added to the middleware system in a "plug and play" manner. Each new adapter only need made to communicate with the standardized generic gateway input. Because the adapters are much more easily generated than completely new gates, significant development savings are realized.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 6 is an illustration of the environment within which the present invention operates.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
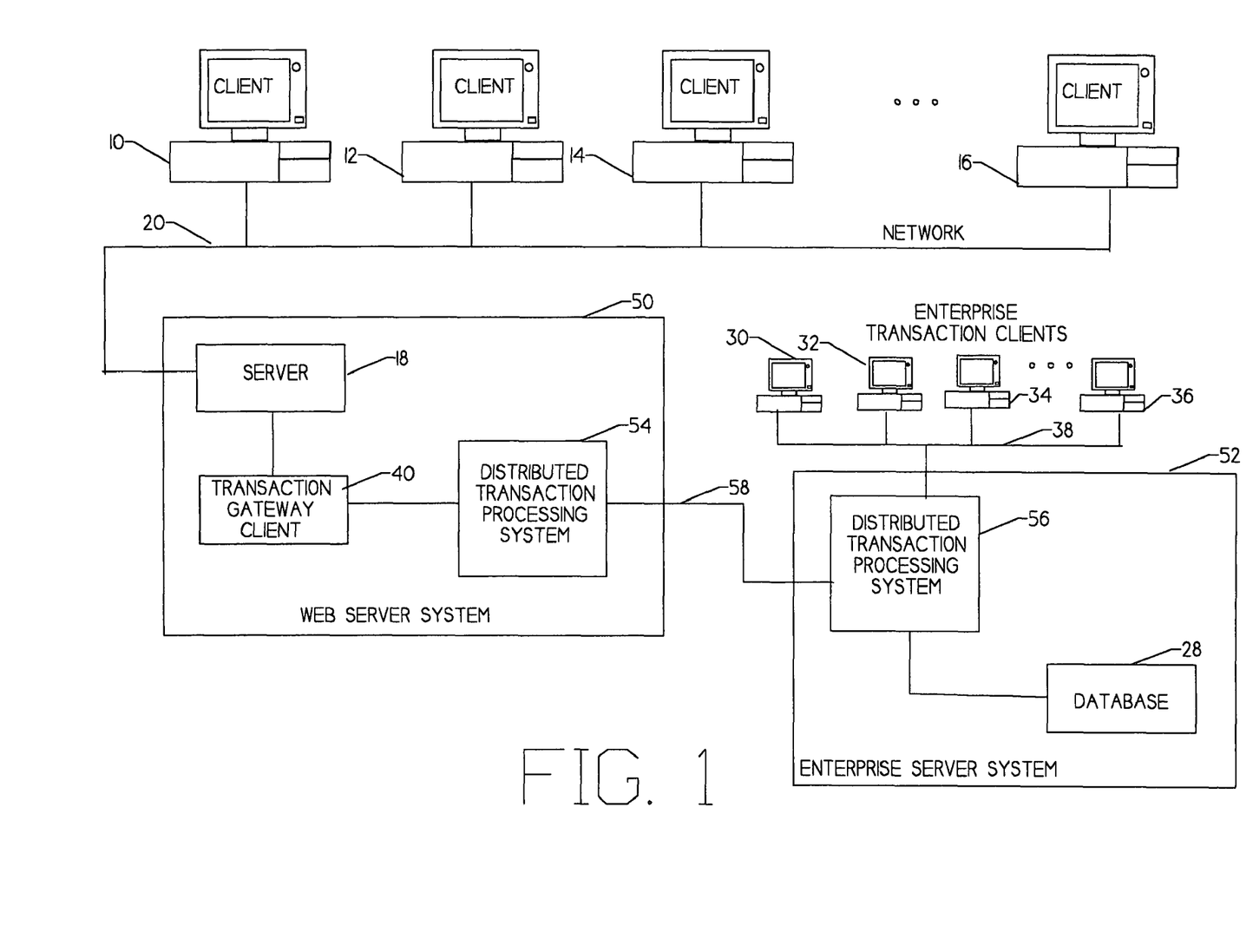
FIG. 1 is a functional block diagram of an exemplary computing environment.

FIG. 1 is a functional block diagram of an exemplary computing environment in which the present invention could be used to make an enterprise based transaction processing system interoperable with a PC/Workstation based requestor. A plurality of PC/Workstations, designated as Clients 10, 12, 14 and 16 are coupled to a Server 18 via Network 20. The Network 20 may be an internal local area network or the Internet.

Each of the Clients 10, 12, 14 and 16, is a Personal Computer/Workstation having operating system software and application software designed to provide Graphical User Interface (GUI) and communications capabilities which enable the Client to communicate with an associated Server application 18 via a Network 20.

The Workstation Server System 50 may be any class of machine(s) which are capable of running a Server application 18 along with a Distributed Transaction Processor 54. The Transaction Processing system 54 is designated as Distributed to make clear that a transaction is formatted on the Workstation Server System 50 and forwarded to the Enterprise Server system 52 for processing. As is explained in further detail below, Distributed Transaction Processing System 54 contains the Queued Transaction connector and the input and output queues required to practice the preferred mode of the present invention.

The exemplary Enterprise Server System 52 is a 2200 Series data processing system from Unisys and also includes a Distributed Transaction Processing System 56. The Distributed Transaction Processing System 56 is intended to encompass the same functionality as a monolithic transaction processing system, however, it is designated as Distributed to be compatible with the Distributed Transaction Processing System 54. The exemplary Distributed Transaction Processing Systems 54 and 56 are intended to encompass transaction manager software, such as Open/OLTP Transaction Manager software from Unisys, and user implemented Open/OLTP services. The Distributed Transaction Processing System 54 and the Distributed Transaction Processing System 56 are coupled via Network 58. Preferably, the network interface for Network 58 is separate from the network interface for Network 20.

The Distributed Transaction Processing System 56 serves data from the Database 28 to the Transaction Clients 30, 32, 34 and 36. The Transaction Clients 30, 32, 34 and 36 are coupled to the Distributed Transaction Processing System 56 via line 38, of which the underlying technology is driven by the application of the Distributed Transaction Processing System 56.

The Transaction Gateway Client 40 allows the Server 18 to interoperate with the Transaction Processing System. When a Client 10, 12, 14 or 16 selects an enterprise based service, the request is routed to the Server 18, which in turn routes the request to the Transaction Gateway Client 40. The Transaction Gateway Client 40 determines the requested service and forwards the necessary information to the Distributed Transaction Processing System 54 and 56. The Distributed Transaction Processing System 54 and 56 processes the request against the Database 28 according to the specified request (e.g., select, update, delete). The Distributed Transaction Processing System 54 and 56 returns data and/or status information to the Transaction Gateway Client 40, which in turn formats the data in an appropriate manner for the Server 18. The Server 18 then returns the information to the requesting Client 10, 12, 14 and 16.

Figure 2:
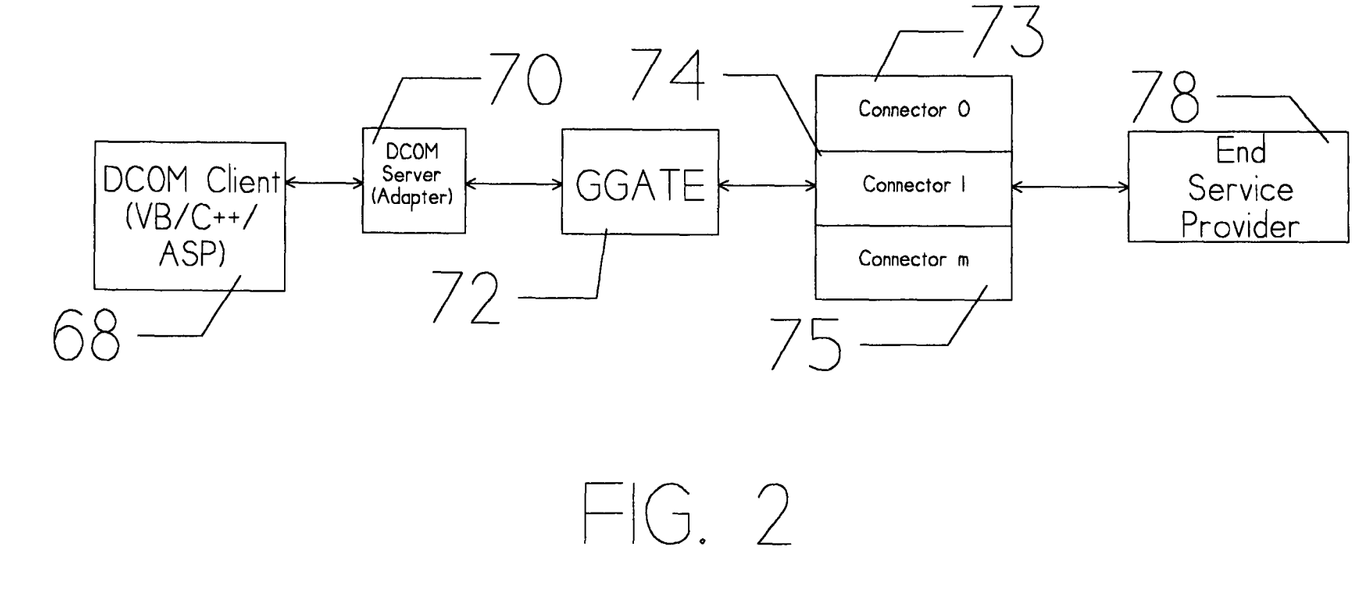
FIG. 2 is a functional block diagram of a generalized embodiment.

FIG. 2 is a functional diagram of the major components of the preferred mode of the present invention. In this example, DCOM client 68 generates a service request using Visual Basic language (i.e., VB), C++, active server page (ASP), or other suitable tools. The service request is transferred to DCOM Server (adapter) 70. As explained in detail below, there is a different adapter for each input format employed.

The adapter of DCOM Server 70 converts the service request input to the standardized input utilized by GGATE 72. This generic gateway is described in greater detail in the above incorporated, co-pending, and commonly assigned patent applications. After processing, GGATE 72 routes the service request via the appropriate of the plurality of Connector 0 73, Connector 1 74, or Connector 2 75. The selected connector transfers the service request to End Service Provider 78, which honors the service request.

Figure 3:
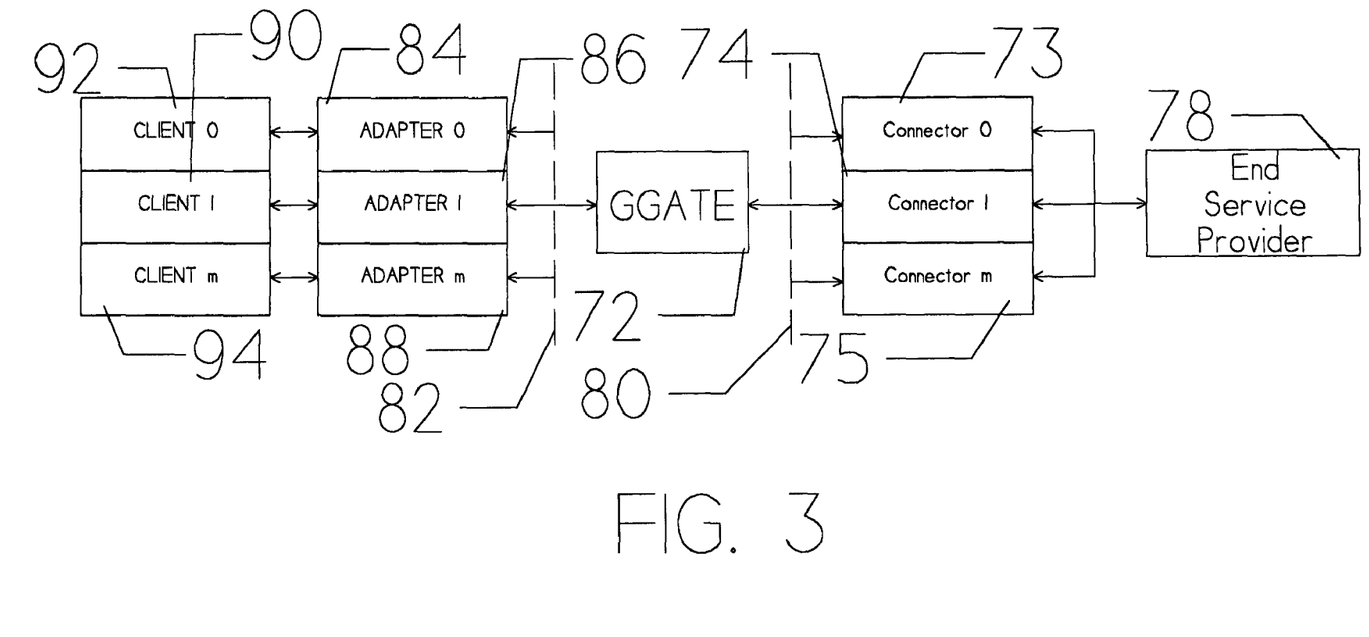
FIG. 3 is a functional block diagram of the preferred mode of the present invention.

FIG. 3 is a functional block diagram of a populated embodiment of the present invention showing a plurality of clients, adapters, and connectors. Client 0 92 prepares service requests in a first format, such as ASP. Client 1 90 prepares service requests in a second format, such as Visual Basic language. Client m 94 prepares service requests in a third format.

Each of the respective clients sends its service requests to the respective associated adapter as shown. Client 0, 92, service requests are sent to Adapter 0, 84. Client 1, 90, service requests are sent to Adapter 1, 86, and Client m, 94, service requests are sent to Adapter m, 88. As explained above, each of these adapters (i.e., 84, 86, and 88) converts the inputs to a single format for input to GGATE 72.

The operation of GGATE 72 is explained in detail in the above cross-referenced U.S. patent applications. The converted and process service requests are transferred to the appropriate one of Connector 0, 73, Connector 1, 74, or Connector m, 75. These connectors are arranged to handle the different formats as with the plurality of adapters. The converted, processed, and connected service requests are transferred to End Service Provider 78 for honoring.

Figure 4:
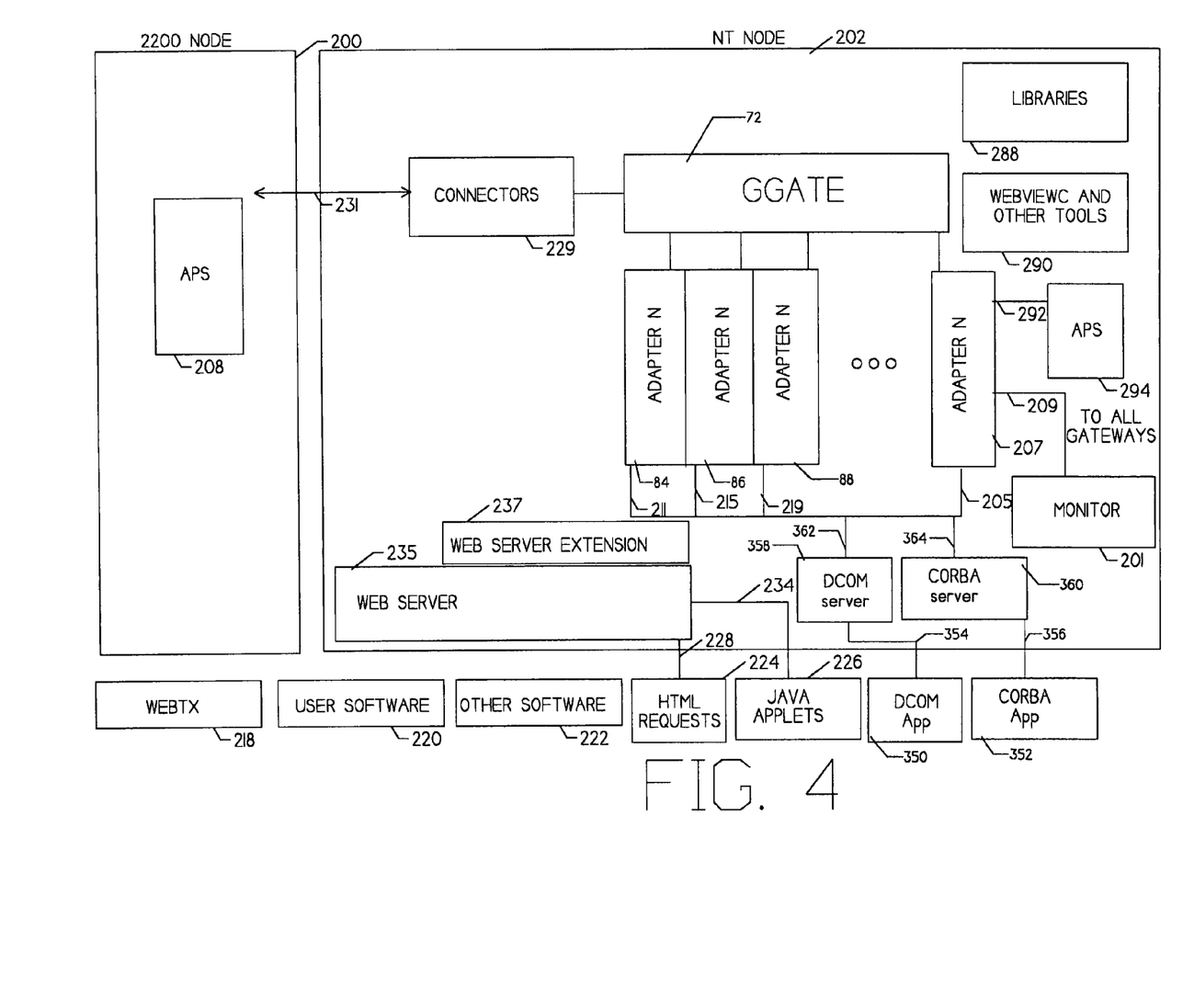
FIG. 4 is a block diagram of a typical environment employing the present invention.

FIG. 4 is a functional block diagram of a generalized environment incorporating the present invention. In general, this is middleware in a client/server computing environment which accepts requests from the client side and routes the requests to the correct place on the server side, then passes a response from the server side back to the client side. In the context of the present invention, a generic gate "marries" a Microsoft DCOM server client/server architecture (such as the NT node shown in 202) with transactional client/server architecture (such as the Unisys 2200 enterprise node, as shown at 200).

The environment, as utilized in the present invention, is comprised of several components, including a Monitor 201, a Web Server Extension 237, a plurality of adapters 213, 217, 221, and 207, GGATE 72, a plurality of connectors 229, the WebViewC compiler 290, and a set of libraries 288.

The Monitor 201 functions as the WebTx administrative tool. One function of the Monitor 201 is to direct service requests to the adapters 84, 86, 88, and 207, as appropriate. Within a Unix environment, the monitor module is known as WebMon, while under the Windows NT environment, the WebTx monitor module is known as WtxSvc.

The DCOM server 358 and CORBA server 360 intercept requests intended for WebTx 218, and instead route the requests to the adapters 84, 86, 88, and 207. The DCOM server 358 and CORBA server 360 will also interpret the response from the GGATE 72, and route the reply. The Web Server Extension is connected to the Monitor 201 via interface 203, an HTML requestor component 224 via interface 228, and a Java Applet 226 via interface 234.

The GGATE 72 is a generic gateway which performs tasks which are grouped into conceptual areas. It receives service requests from the adapters and takes whatever action is necessary to fulfill the request. This typically involves transforming a request (such as a URL from a Web Browser or remote procedure calls RPC's from a DCOM client) into a format which is understandable by a Distributed Transaction Processing System such as a Unisys 2200 Enterprise System 200. GGATE 72 also transforms data returned from the Distributed Transaction Processing System 200 into a formatted response which is returned to the requestor.

The WebViewC compiler 290 is used in conjunction with specific GGATE requirements, such as ViewGate, TUXGate, and JGate. The WebViewC compiler 290 compiles Open/OLTP view files generated on the OLTP enterprise system to create WebTx view files (.wv) and HTML files (.html). The WebViewC compiler is a free-standing component with no direct communication to any of the other components within the WebTx environment.

Other Components include libraries 288 such as the Software Development Kit (SDK) libraries, which provide framework and functions for building Custom Gateways. The SDK is specifically designed to allow customers to build their own gateways. Another type of library present within the WebTx system are Java Class Libraries, which provide class definitions for building JavaGate compatible applets.

Another tool 290 that may exist as a component is DGateAce. DGateAce is analogous to WebViewC, and is used specifically in conjunction with DGate, as part of the Unisys Pathmate system. DGateAce is further described in a co-pending application entitled, "AN AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS".

Unix WebTx uses Inter-Process Communications (IPC) objects such as semaphores, shared memory, message queues and signals, while NT WebTx uses IPC objects such as handles, pipes, mutexes, and events.

Figure 5:
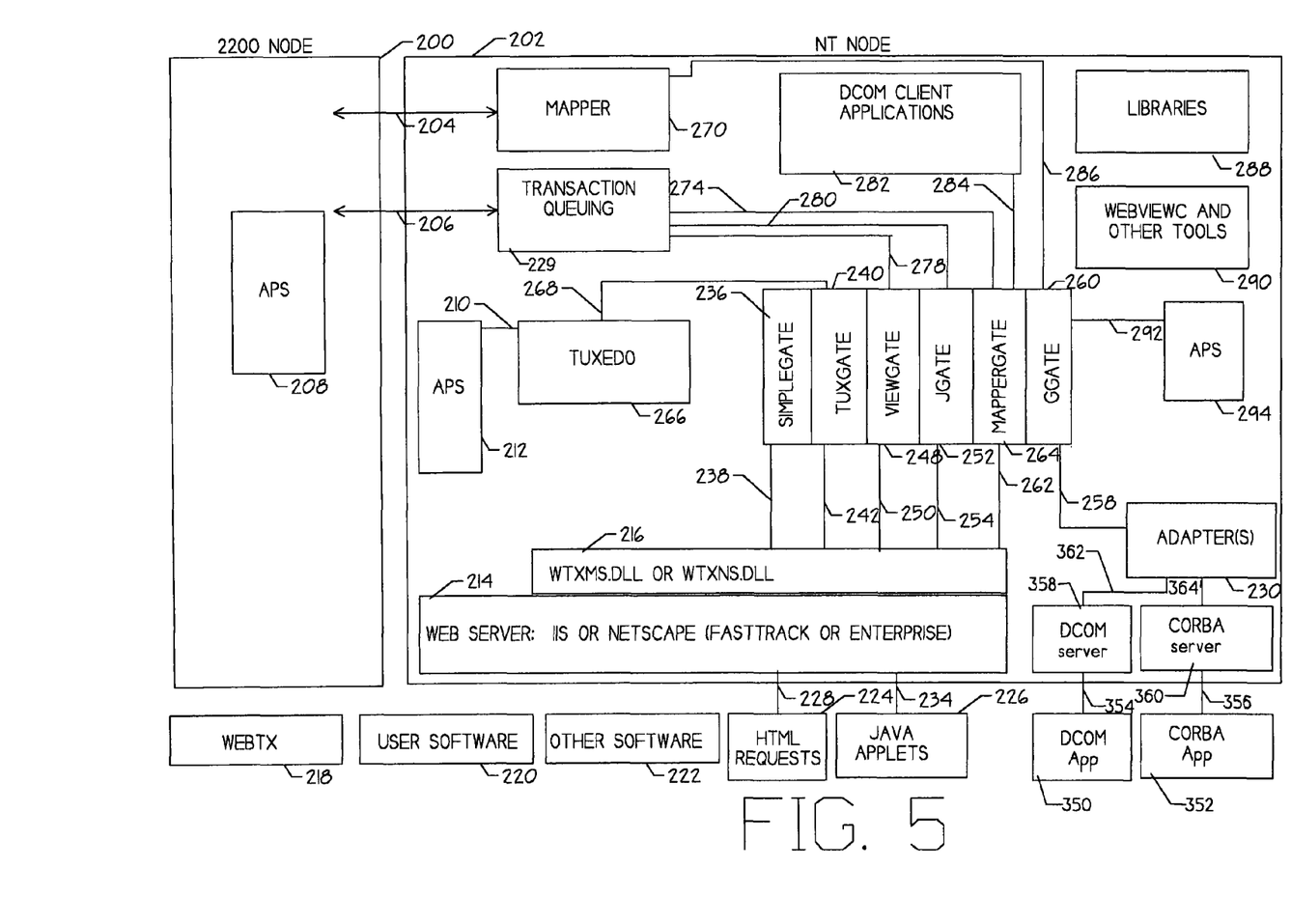
FIG. 5 is a functional block diagram of components utilized within a Microsoft NT environment.

FIG. 5 is a functional block diagram of WebTx components utilized within the Microsoft NT environment. This figure shows specific Gateway implementations within the Windows NT node. The SimpleGate Gateway 236 is specifically utilized as a test tool. It merely echoes a request. The TUXGate Gateway 240 provides generalized access to OLTP services through BEA TUXEDO 266. BEA TUXEDO acts as the hub for a distributed enterprise and Internet 3-tier applications. It provides an open environment that supports a wide variety of clients, databases, networks, legacy systems, and communications options. The FileGate Gateway 244 works in conjunction with a specific OLTP service to access textual files on the Unisys 2200 node. ViewGate 248 provides generalized access to OLTP services on the Unisys 2200 note (specifically HTML output). JGate 252 provides generalized Java applet access to OLTP services on the Unisys 2200 node. The DGate Gateway 256 provides generalized DCOM access to OLTP services on the Unisys 2200 node. The MapperGate Gateway 260 provides generalized access to Mapper applications within the Microsoft Windows NT environment. A Custom Gateway, such as shown at 264, provide a way for a customer to build their own Gateway to interface their own applications to an OLTP enterprise application.

Figure 6:
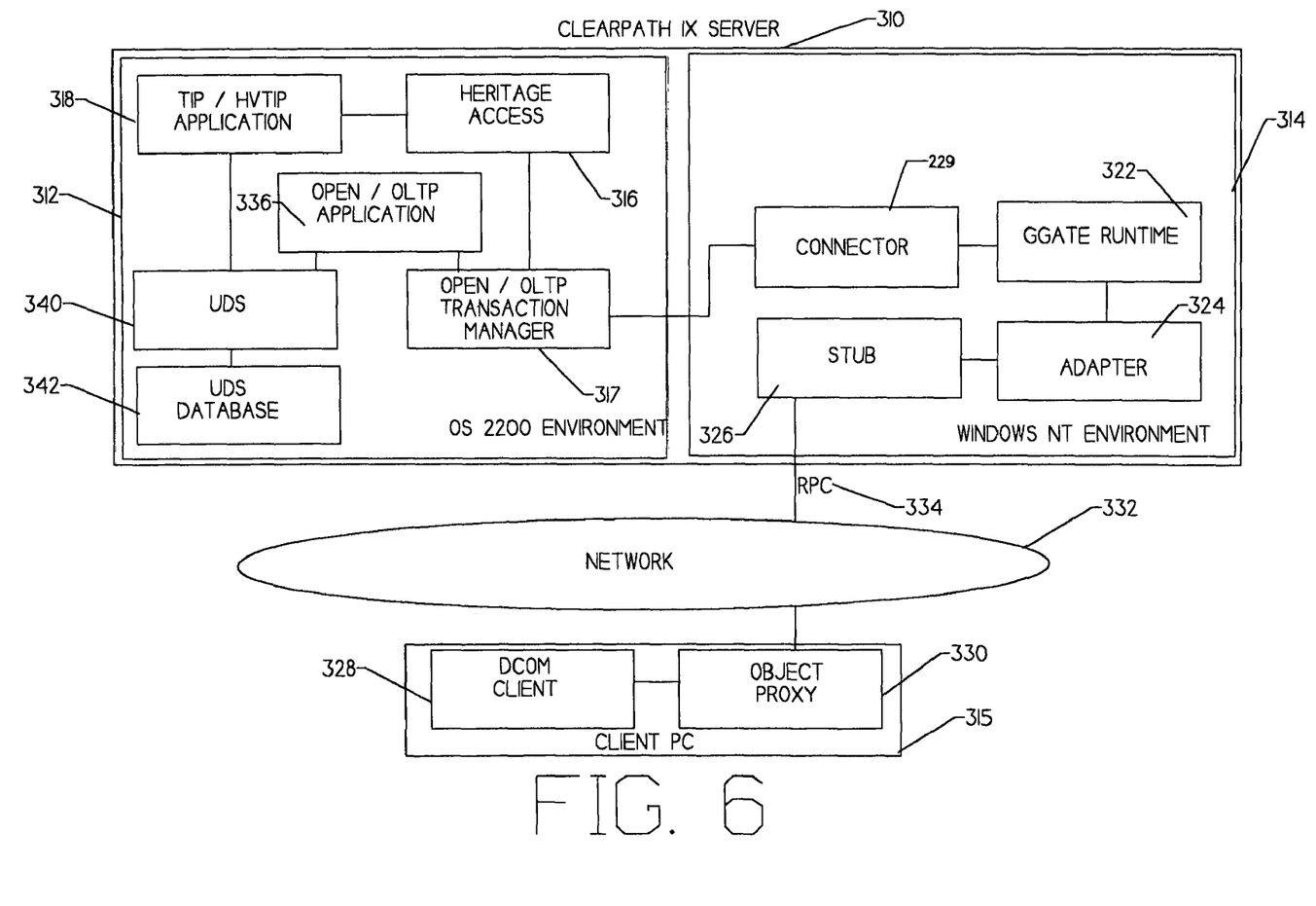
FIG. 6 is a diagram showing the relationship of the key run time software components of the present invention which allow clients to access enterprise applications.

FIG. 6 is a diagram showing the relationship of the key software components of the present invention which allow clients to access enterprise applications via transaction queuing. The Unisys ClearPath IX Server 310 includes both an OS 2200 environment 312 and a Windows NT environment 314. All ClearPath HMP IX Servers 310 include On-Line Transaction Processing (OLTP) software that complies with the X/Open model for Distributed Transaction Processing (DTP). This enables client/server access to existing OLTP applications as well as allowing development of new, distributed client/server applications.

The X/Open DTP software provided for the OS 2200 environment 312 is TransIT Open/OLTP, available commercially from Unisys Corporation. The TransIT Open/OLTP Transaction Manager 317 is the base product for all Open/OLTP software in the OS 2200 environment 312. It includes: 1) a transaction monitor, which executes and routes transactions, performs load balancing, and recovers transactions after failures and 2) A communications resource manager (CRM), which controls communications among distributed applications.

The Open/OLTP Transaction Manager 317 includes interfaces to applications and to database systems (resource managers), including the Database Management System (DMS) and the Relational Database Management System (RDMS).

The OS2200 Environment also includes an Open/OLTP Heritage Application Access component 316. This component 316 allows use of existing OS 2200 OLTP applications, many without modification, as Open/OLTP server programs. This provides an easy way to provide GUI client/server access to existing applications. These Open/OLTP server programs can be Transaction Processing (TIP), High-Volume Transaction Processing (HVTIP) or other online batch programs (as shown at 318). Tools are provided for formatting the data from the existing program into Open/OLTP buffer formats.

When used with Open/OLTP, the present invention makes it possible to provide access to the following types of OS 2200 applications: 1) Native Open/OLTP applications (local), 2) native Open/OLTP applications that participate in distributed transactions with other platforms running Open/OLTP and BEA TUXEDO software, and 3) Heritage applications that use TIP, HVTIP, and DPS.

Existing transactions can be reused without modification, as long as they meet the following criteria: 1) Open/OLTP services must use the request/response model. Conversational services are not supported, and 2) Open/OLTP services must use X_C_TYPE or X_COMMON buffers. X_OCTET buffers are not supported.

The key software components that enable clients to access Open/OLTP applications reside in the Windows NT environment 314 of the ClearPath IX server 310. Connectors 229 consist of middleware which enables applications in the Windows NT environment to execute transactions against OS 2200 applications that use the Open/OLTP transaction manager 317. The GGate runtime software component 322 (GGate.exe) acts as a conduit between the Windows NT DCOM environment 314 and the Open/OLTP environment 312. Adapters 324 accept requests from DCOM Clients, repackage the parameters into the format required by the Open/OLTP transaction manager 317, and then forward the parameters over a named pipe to the GGate runtime 322. The DCOM Server 324 could also include a variety of distributed objects. The stub software component 326 accepts remote procedure calls from object proxies on client PCs and converts them to interface calls to the DCOM Server application 324.

DCOM Client components 328 reside in a Windows 95 or Windows NT Workstation environment on a personal computer 315. The DCOM Client program 328 provides a graphical user interface (GUI) for submitting transaction requests to Adapters 324 and viewing the data are returned. The Object Proxy software component 330 converts requests from the DCOM client 328 to remote procedure calls (RPC) 334. The RPCs 334 are subsequently sent across a network 332 to the stub component 326 in the Windows NT environment 314.

Figure 7:
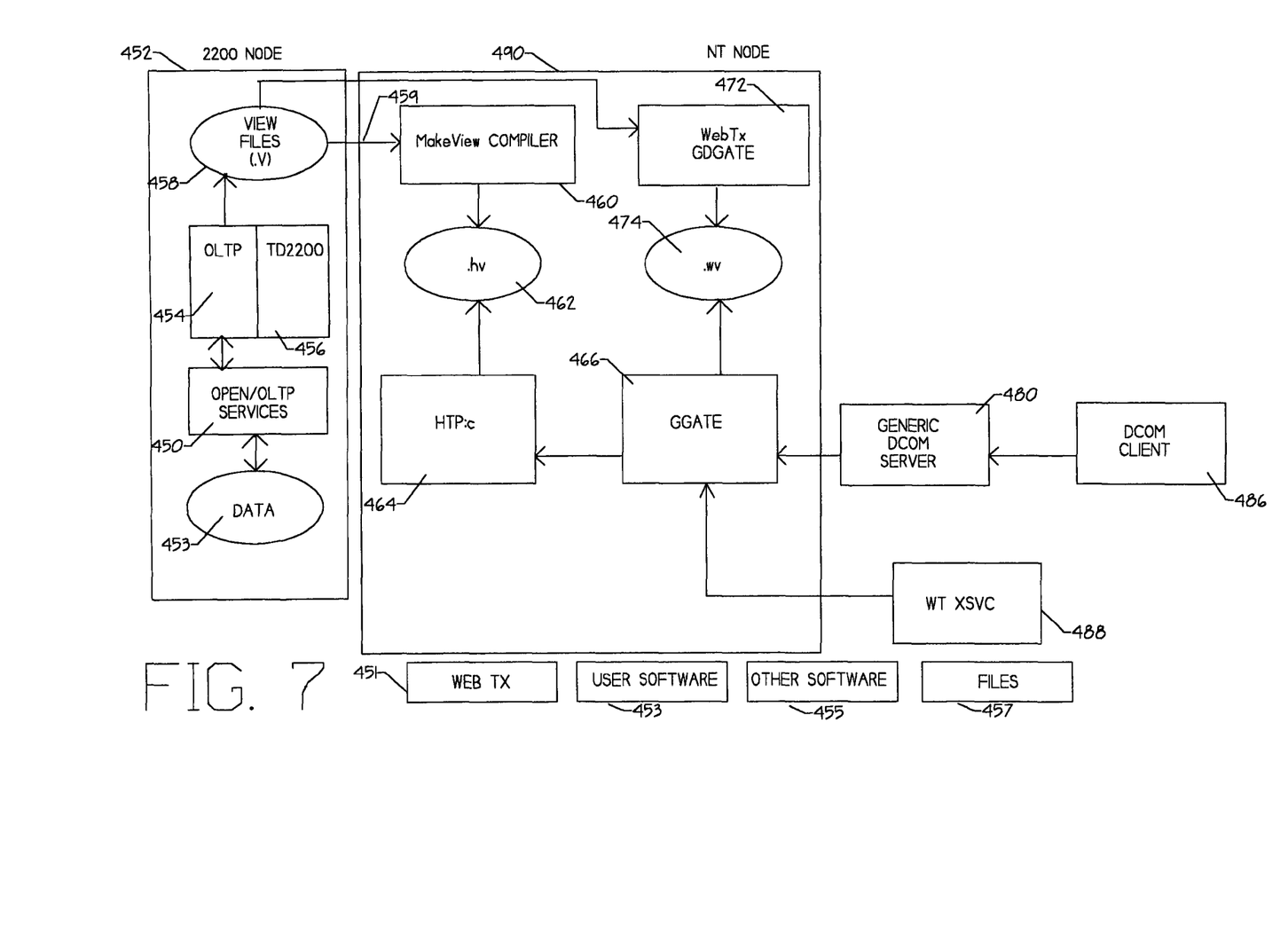
FIG. 7 is a flow diagram illustrating what happens when a request is issued by a client to an enterprise OLTP enterprise application.

FIG. 7 is an illustration of the environment within which the present invention operates. Open/OLTP services 450 are created by a user on an enterprise server 452, such as a Unisys 2200. These services 450 are capable of operating under an OLTP-style transaction processing system. In a preferred embodiment, this OLTP-style system is X/Open compliant. The service 450 is designed to accomplish a specific task, for example, update a user's bank account balance following a debit or credit.

Each service is associated with an input view (.V) file 458 which defines how the input parameters will be provided to the service 450. In particular, the .V file 458 indicates where each input parameter is located in the view file, and the size and type of each input parameter. If a service 450 is to provide output to the user (for example, the updated account balance), another output view file is required to communicate how the information will be presented within the output view buffer.

For all services 450 that are to be accessed from a particular Windows NT node 490, the associated view files 458 must be copied (via FTP or other copy service, shown at 459) to that node 490. Once the view files 458 have been successfully copied to the Windows NT node 490, the ViewC compiler 460 is used to generate ".vv" files 462.

The Distributed Component Object Model (DCOM) is a Microsoft model for distributed object computing. Within the DCOM environment, a remote DCOM Client Application 486 can make a request. The DCOM client 486 can be any type of client, including a Visual Basic client, a C++ client, or a Web Browser with Active Server Pages (ASP). If the request made by the DCOM client 486 is a request for access to a remote process (interprocess request) the request is routed to proxy.dll 484. Proxy.dll 484 is a code segment which receives any client requests targeted for a remote server, and will facilitate the necessary interprocess communications. The proxy.dll 484 understands how to communicate with the Client 486, and also understands how to communicate over an interface 485 which is shared by two or more processes. The proxy.dll 484 "marshals" the request parameters into an independent format so that they may be provided by the client process 486 over the COM-based interface 485, which conforms with the Microsoft DCOM Model. The stub.dll 482, which also understands how to communicate over the common interface 485, "un-marshals" the parameters into a format that can be understood by the DCOM Server Application.exe 470. Thus, the DCOM environment allows machines with entirely different architectures (PCs, Workstations, etc.) to communicate using a common interface.

The specifics of the common interface are described in an Interface Definition Language (IDL) 474. The IDL 474 is operated on by the Microsoft Interface Definition Language (MIDL) compiler 476 to create a set of .c (C) and .h (header) files 478. Then, a second compiler (C++) 480 operates on the .c and .h files to create the stub.dll 482 and the proxy.dll 484. The proxy.dll 484 is linked to the DCOM Client Application.exe 486, and the stub.dll 482 is linked to the DCOM Server Application.exe 470.

Once the DCOM Server 470 un-marshals the parameters, the parameters are packaged into a single buffer and passed to the UDTXNO.dll 468. The UDTXNO.dll 468 and the GGate.exe 466, both of which are the subject of the present invention, are the modules which "DCOM-enable" an OLTP enterprise server 452 such as the Unisys 2200 System.

Having thus described the preferred embodiments of the present invention, those of skill in the art will readily appreciate that the teachings found herein may be applied to yet other embodiments within the scope of the claims hereto attached.

We claim:

1. A data processing system comprising:
   a. a first client work station for entering a first transaction request, wherein said first transaction request has a first one of a plurality of protocols;
   b. an enterprise server for responding to said first transaction request using an enterprise protocol which is not one of said plurality of protocols;
   c. a second client work station for entering a second transaction request wherein said second transaction request has a second one of said plurality of protocols which is different from said first one of said plurality of protocols responsively coupled to said enterprise server via said digital communication network;
   d. a generic gateway interposed between said first user terminal and said enterprise server and between said second user terminal and said enterprise server which responsively couples said first client work station and said second client work station to said enterprise server by converting said first one and said second one of said plurality of protocols to said enterprise protocol; and
   a plurality of adapters interposed between said generic gateway and said first client work station and said second client work station which responsively couples said first client work station to said generic gateway via a first one of said plurality of adapters which corresponds to said first one of said plurality of protocols and which responsively couples said second client work station to said generic gateway via a second one of said plurality of adapters which corresponds to said second one of said plurality of protocols.

2. A data processing system according to claim 1 wherein said digital communication network further comprises the Internet.

3. A data processing system according to claim 2 further comprising a Server housing said generic gateway and providing a middleware environment.

4. A data processing system according to claim 3 wherein said first client work station further comprises a personal computer and wherein said first one of said plurality of protocols utilizes Visual Basic language.

5. An apparatus comprising:
   a. first generating means for generating a first service request using a first one of a plurality of protocols;
   b. second generating means for generating a second service request using a second and different one of a plurality of protocols;
   c. transferring means responsively coupled to said generating means for transferring said first service request and said second service request via a digital data network;
   d. adapting means responsively coupled to said digital data network for adapting said first service request and said second service request to a standardized protocol using a different one of a plurality of adapters to convert said first service request and second service request;
   e. processing means responsively coupled to said adapting means for processing said first service request and said second service request via a generic gateway; and
   f. connecting means responsively coupled to said processing means for transferring said first service request and said second service request to an end service provider via a plurality of connectors.

6. An apparatus according to claim 5 wherein said one of said plurality of adapters corresponds to said one of said plurality of connectors.

7. An apparatus according to claim 5 wherein said digital data communication network is the Internet.

8. An apparatus according to claim 7 wherein said generating means further comprises an industry compatible personal computer operating under a commercially available operating system and wherein said first service request utilizes C++ language.

* * * * *